(12) United States Patent
Wilson et al.

(10) Patent No.: US 9,738,454 B2
(45) Date of Patent: Aug. 22, 2017

(54) FEEDING MECHANISM AND METHOD

(71) Applicant: Morrison Timing Screw Co., Glenwood, IL (US)

(72) Inventors: Nick Wilson, Chicago, IL (US); Ryan Finke, Chicago, IL (US); Dustin Lee, Chicago, IL (US)

(73) Assignee: Morrison Timing Screw Co., Glenwood, IL (US)

( * ) Notice: Subject to any disclaimer, the term of this patent is extended or adjusted under 35 U.S.C. 154(b) by 0 days.

(21) Appl. No.: 15/086,591

(22) Filed: Mar. 31, 2016

(65) Prior Publication Data

US 2016/0207713 A1 Jul. 21, 2016

Related U.S. Application Data

(63) Continuation of application No. 14/582,491, filed on Dec. 24, 2014, now Pat. No. 9,321,597.

(60) Provisional application No. 61/920,590, filed on Dec. 24, 2013.

(51) Int. Cl.
*B65G 47/26* (2006.01)
*B65G 29/00* (2006.01)
*B65G 37/00* (2006.01)
*B65G 33/06* (2006.01)
*B65G 65/46* (2006.01)

(52) U.S. Cl.
CPC ............ *B65G 29/00* (2013.01); *B65G 33/06* (2013.01); *B65G 37/00* (2013.01); *B65G 65/46* (2013.01)

(58) Field of Classification Search
CPC .............................. B65G 47/846; B65G 47/82
USPC .... 198/530, 531, 532, 534, 459.2, 450, 441, 198/419.1, 418.6, 418.7, 430, 480.1, 198/481.1
See application file for complete search history.

(56) References Cited

U.S. PATENT DOCUMENTS

| | | | | |
|---|---|---|---|---|
| 2,868,373 A | * | 1/1959 | Renard | G01M 3/3209 198/341.03 |
| 3,610,437 A | * | 10/1971 | Barakov | B21B 39/002 198/481.1 |
| 3,642,114 A | * | 2/1972 | Crispe | A21C 15/02 198/374 |
| 4,225,032 A | * | 9/1980 | Gherardi | A24C 5/325 198/443 |
| 4,279,115 A | * | 7/1981 | Roberts | B67B 3/2046 198/531 |

(Continued)

*Primary Examiner* — James R Bidwell
(74) *Attorney, Agent, or Firm* — Quinn IP Law

(57) ABSTRACT

A feeding mechanism and method for feeding objects singulated from a bulk mass of objects includes receiving the bulk mass into a hopper system having a hopper screw set including first and second hopper screws and a plurality of feeding pockets defined by the thread forms of the hopper screws. Rotation of the hopper screws tumbles the bulk mass to cascade and singulate individual objects into respective feed pockets. An object set including at least one singulated object is discharged from the hopper screw set by rotation of the hopper screws. A discharge assembly including a ramp and star wheel receives the discharged object set, and transfers the object set to a discharge outlet. The object set output from the discharge outlet is received by a target defined by a receiving article. In one example, the object is rounded, the target is an opening of a container.

17 Claims, 12 Drawing Sheets

(56) References Cited

U.S. PATENT DOCUMENTS

| | | | | |
|---|---|---|---|---|
| 7,036,655 B2* | 5/2006 | Schafer | ............... | B65G 47/08 198/459.2 |
| 7,284,656 B1* | 10/2007 | Stejskal | ............... | A23L 3/001 198/450 |
| 7,967,127 B2* | 6/2011 | Spence | ............... | B65G 29/00 198/459.2 |
| 2005/0077147 A1* | 4/2005 | Guernieri | ............... | B65G 29/00 198/459.2 |
| 2005/0230221 A1* | 10/2005 | Guglielmo | ............... | B65G 29/00 198/459.2 |
| 2009/0255781 A1* | 10/2009 | Carmichael | ............... | B65G 47/681 198/450 |
| 2015/0001041 A1* | 1/2015 | Barber | ............... | B65G 47/086 198/418.7 |

\* cited by examiner

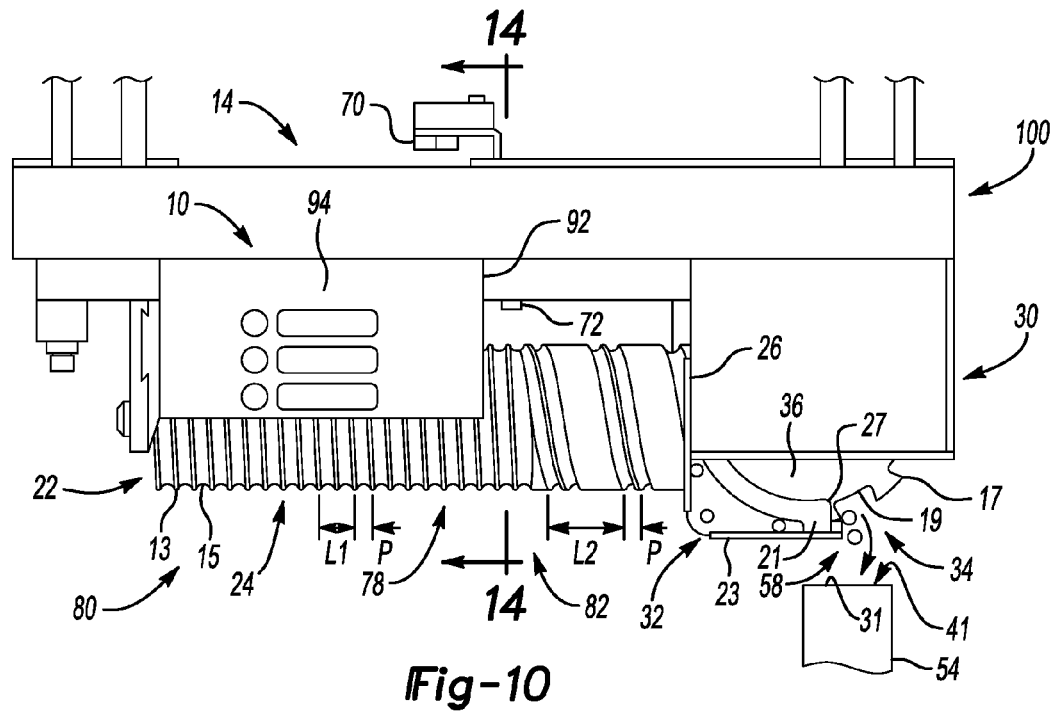
Fig-10
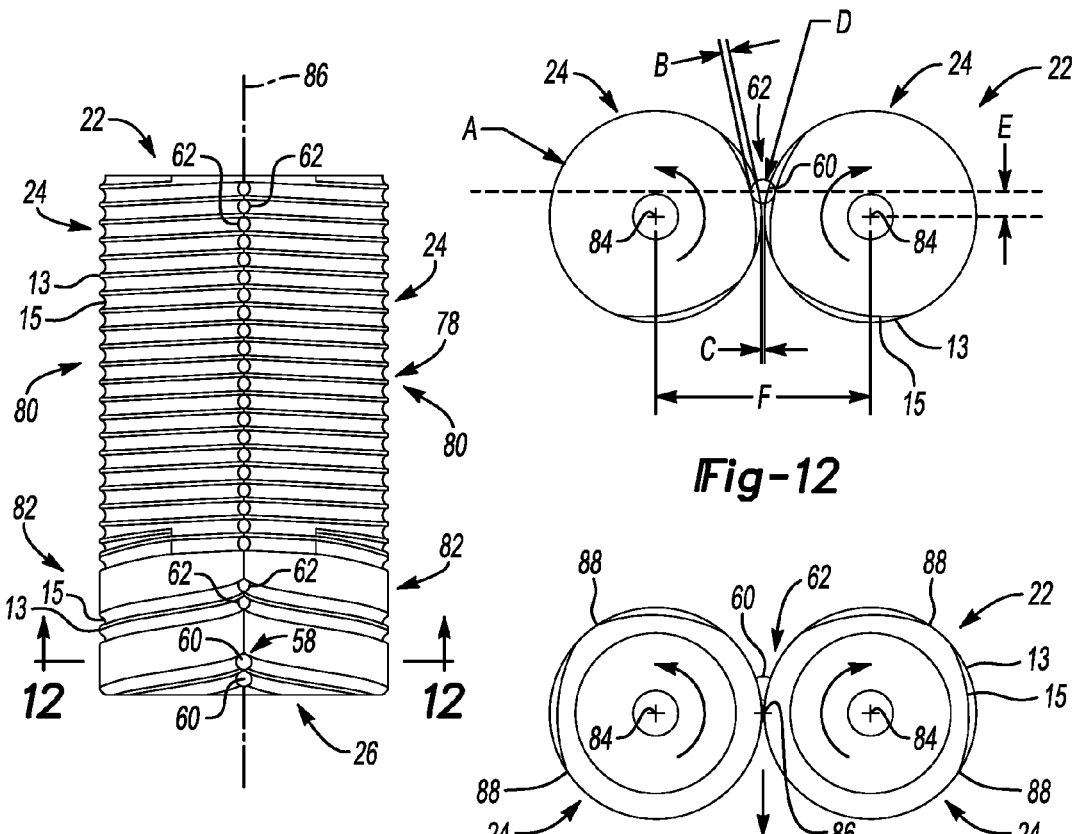
Fig-11
Fig-12
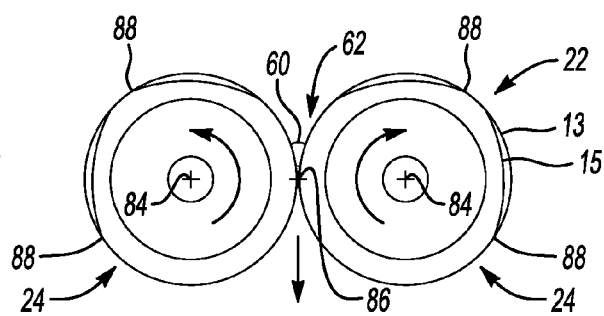
Fig-13

FEEDING MECHANISM AND METHOD

CROSS-REFERENCE TO RELATED APPLICATIONS

This application claims priority to and the benefit of U.S. patent application Ser. No. 14/582,491 filed Dec. 24, 2014 and to U.S. Provisional Patent Application No. 61/920,590 filed on Dec. 24, 2013, which are hereby incorporated by reference in their entirety.

TECHNICAL FIELD

The present invention relates to a feeding mechanism for feeding of individual rounded or semi-rounded objects singulated from a bulk feed source.

BACKGROUND

Efficiently feeding rounded objects requires the ability to meter a required number of objects to be fed, to accurately feed the metered objects to a target position defined by an article receiving the objects, and to monitor the feeding process such that in the event of a misfeed of the metered objects, the receiving article is segregated from further processing. The speed and/or feeding rate at which objects may be fed may be limited by the metering and/or orientation method used to convey the object or objects to be fed into a feeding position, and may be further limited by the feeding method which may rely only on gravity feeding to feed the object into the receiving part such that the drop rate of the fed object is limited by gravity. In some cases, the configuration of the receiving article, the configuration of fed object, and/or the number of objects to be fed to the receiving article require the use of manual feeding methods to meter and/or to feed the objects to the receiving article, where the manual methods can be relatively slow and labor intensive, and the accuracy of such methods can be affected by human error.

SUMMARY

An automated feeding mechanism and method for feeding individual rounded or semi-rounded objects singulated from a bulk feed source is provided. The feeding method segregates individual objects from the bulk source to group the objects into an object set and to transfer the object set to a star wheel and ramp assembly which projects the object set at a predetermined trajectory to a target defined by the receiving part. Each object set includes the same predetermined number of objects. In one example, the predetermined number of objects in each object set is one. In another example, each object set including a plurality of objects, such that the predetermined number of objects in each object set is a number greater than one. In a non-limiting illustrative example, the object set being fed includes a predetermined number of rounded objects such as ball bearings, marbles, or the like, and the receiving article is a container having a container opening, where the container opening defines the target such that the fed object set is projected from the feed ramp by the star wheel to the container opening, e.g., the target, and is received via the opening into the container. The feeding mechanism described herein is advantaged by being capable of feeding objects at a high rate of speed. By way of non-limiting example, the feeding mechanism described herein is capable of discharging an object set to a receiving article at a rate of 300 object sets per minute. In one example, the object set consists of two objects being discharged to each container, such that the feeding mechanism is capable of discharging 600 objects per minute.

The feeding mechanism, in a non-limiting and illustrative example, includes a hopper system including a hopper and a hopper screw set. The hopper includes a first opening to receive a plurality of objects and a second opening to receive a hopper portion of the hopper screw set. The hopper screw set includes the hopper portion and a discharge portion disposed between the hopper portion and a discharge end of the hopper screw set. A discharge wall defined by the hopper is configured to separate the discharge portion and the hopper portion. The hopper screw set includes a first hopper screw and a second hopper screw, where each of the first and second hopper screws define a respective thread form and are rotatable on a respective screw axis. The first and second hopper screws are adjacent each other to define a longitudinal axis therebetween, such that the thread forms of the first and second hopper screws cooperate to define a plurality of feed pockets parallel to the longitudinal axis and in communication with the second opening. Each feed pocket of the plurality of feed pockets is configured to receive an object of the plurality of objects to singulate the object from the plurality of objects.

The longitudinal axis of the hopper screw set and the screw axes of the first and second hopper screws are coplanar in a first plane, and the first and second hopper screws are rotatable relative to each other such that the thread forms of the first and second hopper screws during rotation are mirror images relative to a second plane perpendicular to the first plane and including the longitudinal axis. Rotation of the first and second hopper screws is coordinated such that each respective feed pocket is progressed toward the discharge wall by the rotation of the respective thread forms during rotation of the first and second hopper screws. Rotation of the first and second hopper screws is coordinated such that the first and second hopper screws are rotatable upward and outward relative to the hopper. A hopper outlet is defined by the discharge wall and the hopper screw set such that each respective feed pocket is progressed to the discharge end of the hopper screw set via the hopper outlet during rotation of the first and second hopper screws.

The thread form of the hopper portion of each of the first and second hopper screws is characterized by a first lead, and the thread form of the discharge portion of each of the first and second hopper screws is at least partially characterized by a second lead which is different from the first lead such that each respective feed pocket is progressed to the discharge end at a predetermined feed interval defined by the second lead. The thread form of each of the first and second hopper screws is characterized by a predetermined number of thread starts, where the predetermined number of thread starts defines the number of feed pockets progressed to the discharge end at the predetermined feed interval, and such that the number of thread starts determines the number of objects in an object set.

The feeding mechanism further includes a ramp including a ramp surface defining a receiving end and a terminating end, where the receiving end position immediately adjacent the discharge end of the hopper screw set to receive an object set discharged from the discharge end of the hopper screw set such that the received object set is conveyed via the ramp surface to the terminating end, which defines a discharge outlet. The object set includes a predetermined number of objects which have been singulated in a predetermined number of feed pockets. An article feeding system is configured to sequentially present each of a plurality of receiving articles to the discharge outlet, where each receiving article defines a target. The discharge outlet is configured to discharge the object set such that the object set is received by the target of the receiving article presented by the article feeding system.

A method for feeding objects using the feeding mechanism described herein includes receiving a bulk mass of objects to the hopper system of the feeding mechanism described herein, and rotating the first and second hopper screws to induce tumbling of the bulk mass of objects in the hopper such that at least one object from the bulk mass is received into a respective one of the plurality of feed pockets to provide at least one singulated object. The method includes progressing the at least one singulated object in the respective one of the feed pockets from the hopper portion to the discharge end of the hopper screw set, and discharging an object set from the discharge end where the object set includes a predetermined number of singulated objects. The predetermined number of singulated objects in each object set is the same. An object set may include one object, or may be formed with more than one object. Rotating the first and second hopper screws causes the bulk mass of objects in the hopper to accumulate at the discharge wall to cascade individual objects in the bulk mass of objects away from the discharge wall and to the feeding pockets.

The method further includes discharging a plurality of object sets from the discharge end, where each of the object sets is sequentially discharged at a predetermined interval from another object set, and receiving, via a ramp of a discharge assembly, the object set discharged from the discharge end of the hopper screw set. The object set is retained in a recess defined by a star wheel and a ramp surface of a ramp, and the star wheel is rotated to transfer the object set from a receiving end of the ramp to a terminating end of the ramp, where the object set is discharged via a discharge outlet defined by the terminating end of the ramp.

The method includes presenting a receiving article to the discharge outlet, via a feeding system including a feeding screw, and receiving, via a target defined by the receiving article, the object set discharged from the discharge outlet. In an illustrative example, the object is at least partially rounded, the receiving article is a container defining an opening, and the target is defined by the opening such that the object set is received into the container via the opening.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 10 is a schematic front side view of the hopper system of FIG. 7 including a double start hopper screw set;

FIG. 11 is a schematic top view of the double start hopper screw set of FIG. 10 defining a plurality of feed pockets;

FIG. 12 is a schematic view of section 12-12 of the hopper screw set of FIG. 11 showing direction of rotation and an object positioned in a feed pocket defined by the hopper screw set;

FIG. 13 is a schematic end view of the discharge end of the hopper screw set of FIG. 11;

DETAILED DESCRIPTION

Figure 1:
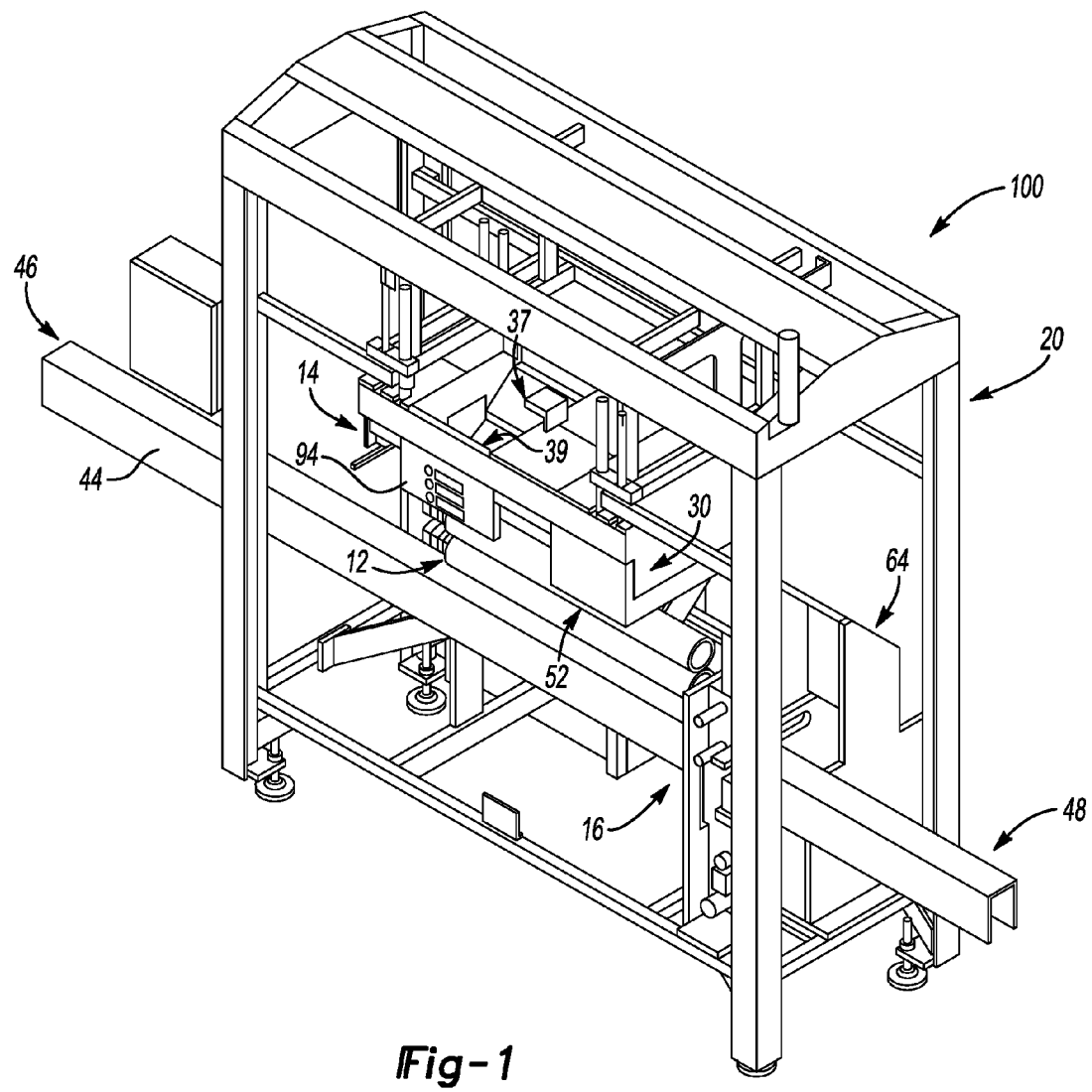
FIG. 1 is a schematic perspective view of a feeding mechanism for feeding of round or semi-round objects from a bulk feed hopper including a hopper system and an article feeding system.

Referring to the drawings wherein like reference numbers represent like components throughout the several Figures, the elements shown in FIGS. 1-24 are not necessarily to scale or proportion. Accordingly, the particular dimensions and applications provided in the drawings presented herein are not to be considered limiting.

Figure 2:
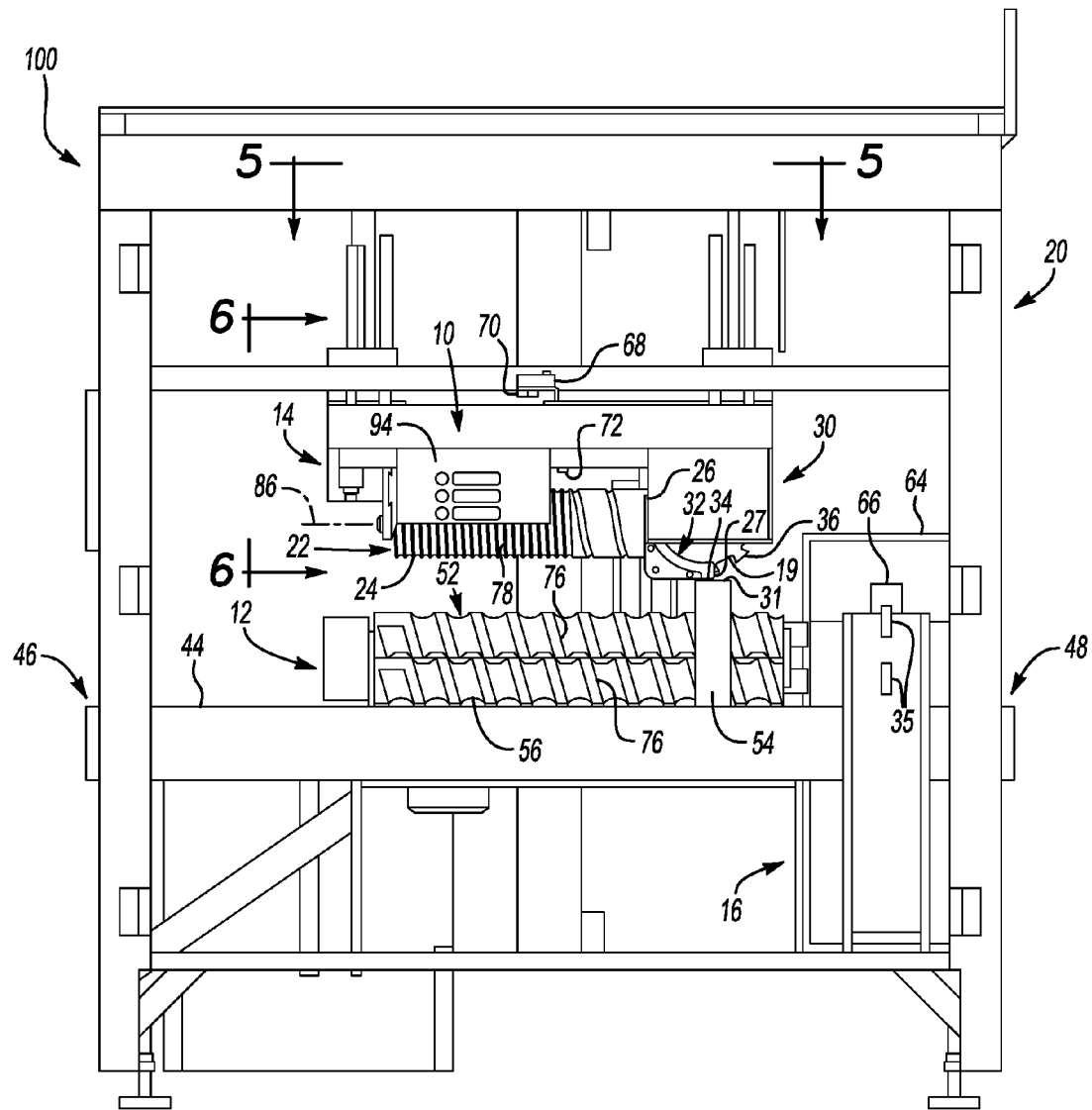
FIG. 2 is a schematic front view of the feeding mechanism of FIG. 1.
Figure 3:
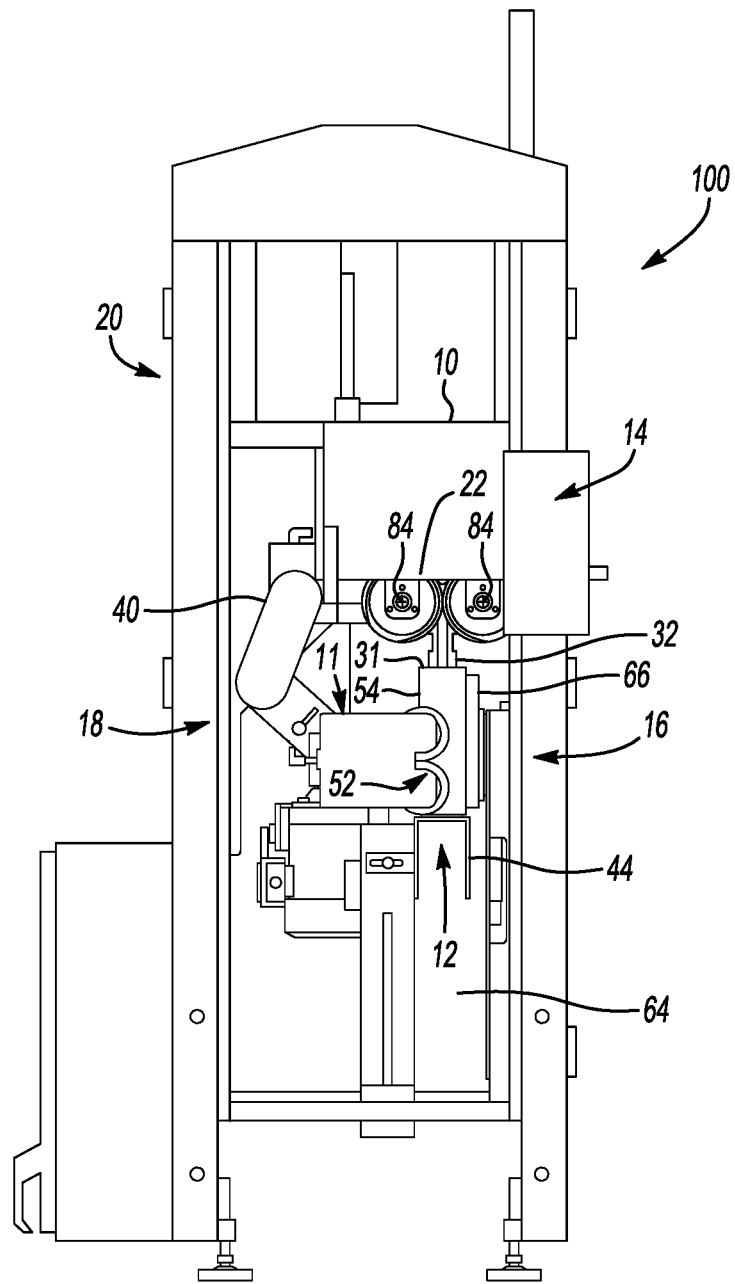
FIG. 3 is a schematic end view of the feeding mechanism of FIG. 1, viewed from the infeed end of the feeding mechanism.
Figure 4:
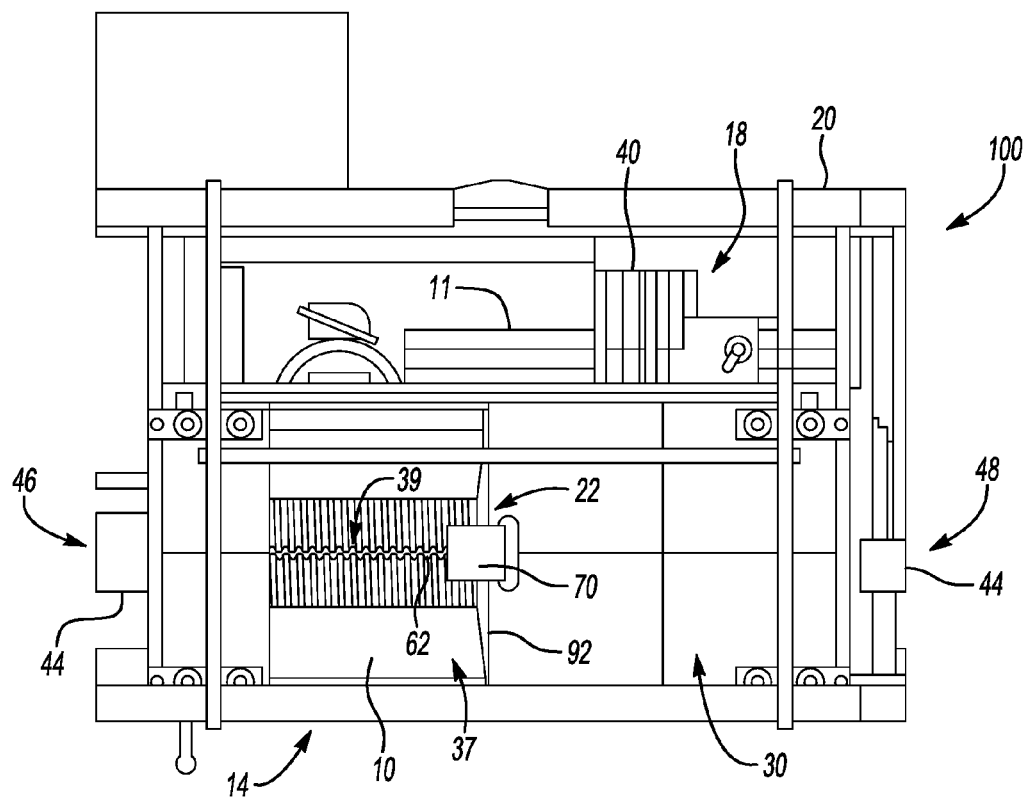
FIG. 4 is a schematic top view of the feeding mechanism of FIG. 1.
Figure 5:
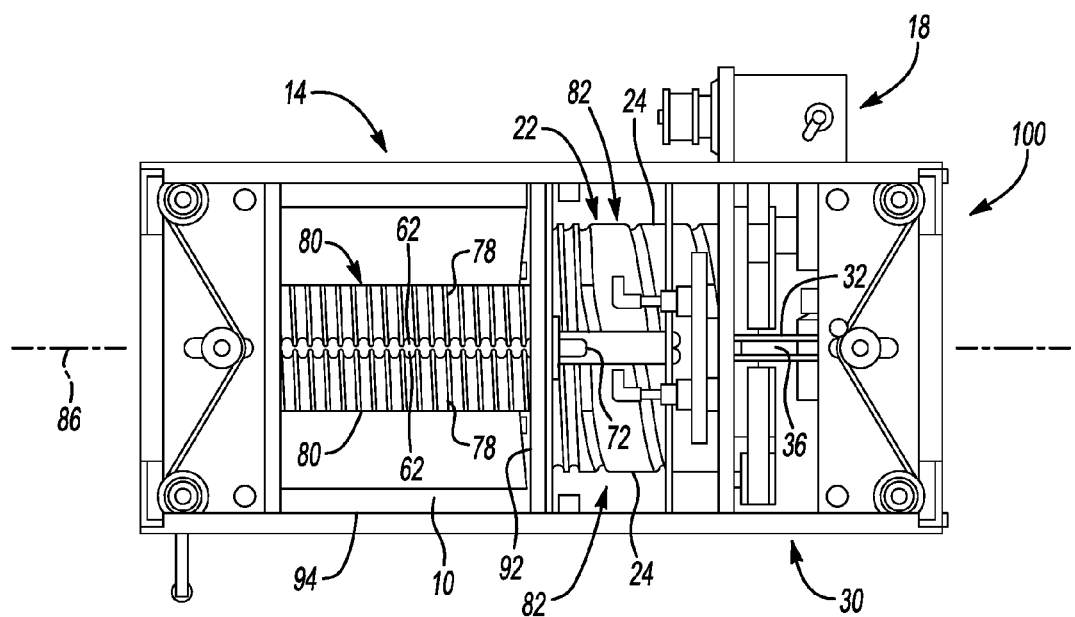
FIG. 5 is a schematic view of section 5-5 of FIG. 2 showing a top view of the hopper system of FIG. 1.

Referring to FIGS. 1-5, a feeding mechanism is indicated generally at 100, and includes a feeding system indicated generally at 12, a hopper system indicated generally at 14, a discharge assembly generally indicated at 30, a reject system indicated generally at 16, and a drive system indicated generally at 18 (see FIG. 3). The feeding mechanism 100 includes a frame assembly 20 to which the feeding system 12, the hopper system 14, the discharge assembly 30, the reject system 16 and the drive system 18 are attached. The hopper system 14 includes a hopper 10 having a first opening 37 and a second opening 39, where the first opening 37 is accessible to receive a bulk mass 28 of objects 60, and the second opening 39 is shaped to position a hopper screw set 22 adjacent the second opening such that the objects 60 can only be discharged from the second opening 39 of the hopper 10 via a plurality of feed pockets 62 defined by the hopper screw set 22 and a contoured portion 74 of the second opening 39. The feeding mechanism 100, as described in further detail herein, is configured such that the hopper system 14 uses the hopper screw set 22 to singulate individual objects 60 from the bulk mass 28 of objects 60 into the plurality of feed pockets 62 and to segregate a predetermined number of the singulated objects 60 into an object set 58, where the predetermined number of the singulated objects 60 in each object set 58 is defined by the number of thread starts 88 of each hopper screw 24 of the hopper screw set 22, where the term "singulate" as used herein, refers to the process of separating an individual object 60 from the bulk mass 28 of objects 60. The separated individual object 60, which in the example provided herein is the individual object retained by and nested in a respective feed pocket 62, may be referred to herein as a "singulated object." The object set 58 is fed by the hopper screw set 22 at a predetermined interval to the discharge assembly 30, and via the discharge assembly 30 to a target 41 (see FIG. 2) defined by a receiving article 54, such that the receiving article 54 receives the object set 58 within the boundaries of the target 41. In a non-limiting example, the object 60 is a rounded, e.g., substantially spherical object, and the receiving article 54 is a container having a container opening 31 defining the target 41, such that the object set 58 is fed to the container opening 31 via the hopper screw set 22 and discharge assembly 30 to the container opening 31 and is received into the container 54 via the container opening 31. In a non-limiting illustrative example described herein, the receiving article 54 may be referred to herein as a container 54, and the target 41 is understood to be defined by and may be referred to within the context of the illustrative example as the container opening 31.

In the example shown in FIGS. 1-24, the container 54 is presented to a discharge outlet 34 of the discharge assembly 30 at the predetermined interval by the feeding system 12 via a conveyor 44, using a feeding screw set 52, such that the container 54 is positioned to receive the object 60 from the discharge outlet 34. The conveyor 44 includes an infeed end 46 for receiving a plurality of containers 54 to the conveyor 44, and an outfeed end 48 for outputting the plurality of containers 54 from the conveyor 44. Additional conveying systems (not shown) may be used in conjunction with the feeding mechanism 100 for providing the plurality of containers 54 to the infeed end 46 of the conveyor 44 and for removing the plurality of containers 54 from the outfeed end 48 of the conveyor 44. For clarity of illustration, FIG. 2 shows a single container 54 positioned at the discharge outlet 34 of the discharge assembly 30. It would be understood that in use, a plurality of containers 54 would be fed via the conveyor 44 and by the feeding screw set 52 for individual and sequential presentation to the discharge outlet 34, and showing only a single container 54 in FIG. 2 for clarity of illustration is non-limiting.

The drive system 18 includes a drive motor and syncro bar 40 and is configured such that the drive system 18 uses the single drive motor to concurrently drive rotation of the hopper screw set 22, rotation of the feeding screw set 52, and rotation of a star wheel 36 of the discharge assembly 30 where the rotation of these elements is coordinated such that an object set 58 including at least one object 60, and a corresponding container 54 are presented concurrently to the discharge outlet 34 of the discharge assembly 30 at a predetermined interval, such that the object set 58 is released from the discharge outlet 34 and the objects 60 of the object set 58 drop via gravity to the target 41 (defined by the container opening 31 in the present example), and through the container opening 31 into the container 54, as described in further detail herein and as illustrated by the accompanying Figures and drawings. The drive system 18 further includes one or more clutches positioned to prevent damage to the feeding mechanism 100 in the event of jamming of a container 54 or object 60. For example, as shown on Drawing Page 19 of U.S. Provisional Patent Application No. 61/920,590 filed on Dec. 24, 2013 (U.S. Ser. No. 61/920, 590), which is hereby incorporated by reference in its entirety, a container feed clutch is included in the container feeding system 12 to prevent damage to the container feeding system 12 in the event of jamming of a container 54, for example, in the feeding screw set 52 or on the conveyor 44. As shown on Drawing Page 47 of U.S. Ser. No. 61/920, 590, a hopper system clutch is included in the hopper system 14 to prevent damage to the hopper system 14 in the event of jamming of an object 60 in the hopper system 14 and/or the hopper screw set 22. As shown on Drawing Page 44 of U.S. Ser. No. 61/920,590, a discharge assembly clutch is included in the discharge assembly 30 to prevent damage to the discharge assembly 30 in the event of an object 60 jamming between the star wheel 36 and ramp assembly 32 and/or in the discharge assembly 30.

The container feeding screws 56 of the feeding screw set 52 are configured to rotate in the same direction, which in the present example is clockwise as viewed from the infeed end 46 of the conveyor 44. The feeding screws 56 may be adjusted in position relative to the conveyor 44 for the size, height or other shape characteristics of the container 54 being fed, for example, using the adjustment mechanism 11 shown on Drawing Page 20 of U.S. Ser. No. 61/920,590. A first feeding screw set 52 may be replaced with a second feeding screw set 52 having a different diameter, different screw form 76, etc., for example, to change over the feeding system 12 from feeding a first container 54 having a first size or shape to feeding a second container 54 having a different size or shape, or to change over the feeding system 12 from feeding a container to feeding a receiving article 54 which may be a non-container article defining a target 41 to receive an object set 58. The feeding screws 56 and/or the feeding screw set 52 may be configured to dwell the container 54 at the discharge outlet 34, e.g., to momentarily halt the forward motion of the container 54 on the conveyor 44 at the discharge outlet 34 to receive the object set 58 via the container opening 31. In one example, a portion of the feeding screw 46 immediately adjacent the discharge outlet 34 includes a vertical section in the screw pitch of the screw form 76 to momentarily halt the container, e.g., to dwell the container at the discharge outlet 34. The feeding screw set 52 is configured such that the timing of the dwell, e.g., the occurrence and duration of the dwell, is coordinated with release of the object set 58 from the discharge outlet 34 at a predetermined interval.

Referring to FIGS. 5, 9 and 11-13, the hopper screw set 22 is aligned to define a plurality of feed pockets 62 extending the axial length of the hopper screw set 22. Referring now to FIGS. 11-13, the hopper screws 24 are mounted on fixed centers 84 at a distance F such that a minimal clearance C is defined between the hopper screws 24 at a longitudinal axis 86 of the hopper screw set 22, to allow non-interfering rotation of each of the hopper screws 24 relative to the other and to define a plurality of feed pockets 62 along the longitudinal axis 86 of the hopper screw set 22. The fixed center 84 of each hopper screw 24 may also be referred to herein as a hopper screw axis 84 extending the longitudinal length of the hopper screw. As shown in FIG. 11, the thread forms 78 of the hopper screws 24 are aligned axially such that the crest 13 or major diameter 13 of the thread form 78 of one hopper screw 24 is aligned within the crest 13 or major diameter 13 of a corresponding thread form 78 of the other hopper screw 24, and such that the root 15 or minor diameter 15 of the thread form 78 of one hopper screw 24 is aligned with the root 15 or minor diameter 15 of a corresponding thread form 78 of the other hopper screw 24 to form the plurality of feed pockets 62. As shown in FIGS. 12 and 13, the thread forms 78 of the hopper screws 24 are aligned such that the thread form 78 of one hopper screw 24 mirrors the thread form 78 of the other hopper screw 24 relative to a vertical plane (relative to the Figures as shown on the page) between the first and second hopper screws 24 and including the longitudinal axis 86, such that as the hopper screws 24 rotate up (as shown on the page) and away from each other as shown in FIGS. 12 and 13, an object 60 in a feed pocket 62 defined by the hopper screw set 22 is progressed axially from the first portion 80 of the hopper screw set 22 to the second portion 82 of the hopper screw set 22. The first portion 80 of the hopper screw set 22 may be referred to herein as the hopper portion, and the second portion 82 of the hopper screw set 22 may be referred to herein as the discharge portion. The longitudinal axis 86 of the hopper screw set 22 and the hopper screw axes 84 of the hopper screws 24 are coplanar in a horizontal plane (relative to the Figures as shown on the page). The hopper screws 24 are further aligned radially such that during rotation of the hopper screw set 22, the thread start 88 at the discharge end 26 of the first hopper screw 24 aligns with the thread start 88 at the discharge end 26 of the second hopper screw 24 at the feed pocket 62 height E to discharge an object 60 in the feed pocket 62 defined by the thread starts 88 from the discharge end 26 of the hopper screw set 22.

The hopper screw 24 is characterized by a major diameter A and a pocket depth B which are configured such that an object 60 having a nesting diameter D will nest or position in the feed pocket 62 such that the nesting diameter is at a pocket height E, and the pocket depth B at the pocket height E is approximately one-third (⅓) of the nesting diameter D of the object 60. In the example shown, the object 60 is spherical, such that the nesting diameter D is the spherical diameter of the object 60. In the example shown, the pocket depth B is substantially equivalent to the difference between the major diameter defined by the crest 13 and the minor diameter defined by the root 15 of the thread form 78 of the hopper screw 24. For rounded or semi-rounded objects 60, the nesting diameter D corresponds to the diameter of the rounded portion or surface of the object 60, where in a nested position, e.g., the position of the object 60 in the feed pocket 62, the diameter of the rounded portion of the object 60, is at the pocket height E. Notably and as shown in FIG. 12, the pocket height E is greater than the spherical radius of the object 60, such that in the nested position, the object 60 does not protrude into or become caught between the hopper screws 24, and the object 60 sits vertically (as shown on the page) above a horizontal plane (as shown on the page) defined by the axes of the hopper screws 24. The hopper screws 24 rotate upward and away from each other, as viewed from the discharge end 26 and shown in FIGS. 12 and 13, with the left (as shown on the page) hopper screw 24 rotating in a counterclockwise direction and the right (as shown on the page) hopper screw 24 rotating in a clockwise direction. The rotation of the hopper feed screws 24 upward and away from each other generate upward and outward forces on the nested object 60 in the feed pocket 62, offsetting the gravity force exerted by the nested object 60 and preventing the nested object 60 from becoming fixed or lodged between the hopper feed screws 24. As described previously and shown in FIG. 9, rotation of the hopper screws 24 cause the nested objects 60 to be progressed toward the discharge end 26 of the hopper screw set 22 and to be discharged from the hopper screw set 22 at the thread starts 88, as shown in FIGS. 9 and 21-24.

Figure 8:
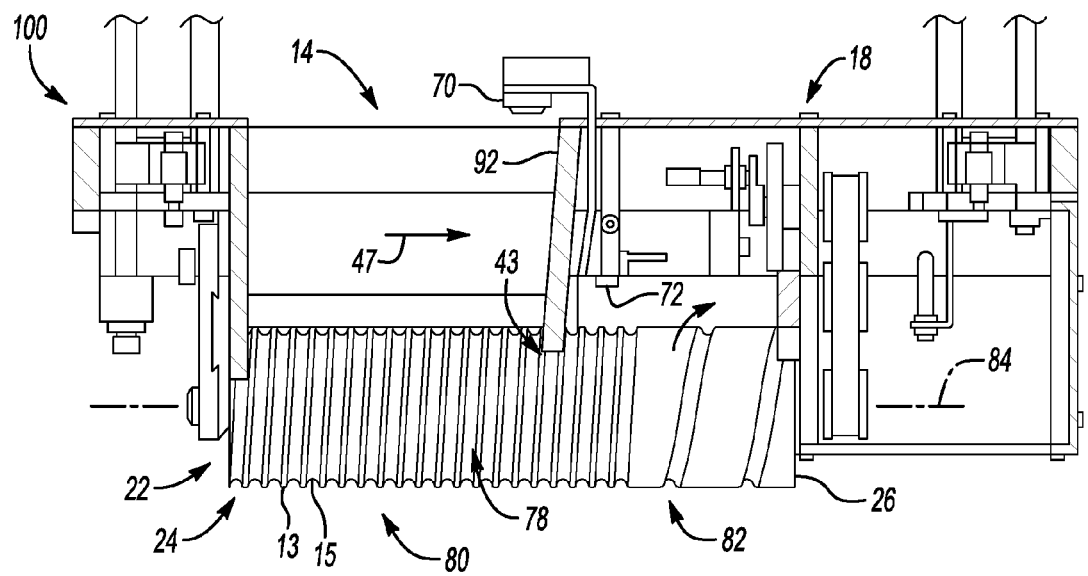
FIG. 8 is a schematic view of section 8-8 of the hopper system of FIG. 6 without the discharge assembly.
Figure 9:
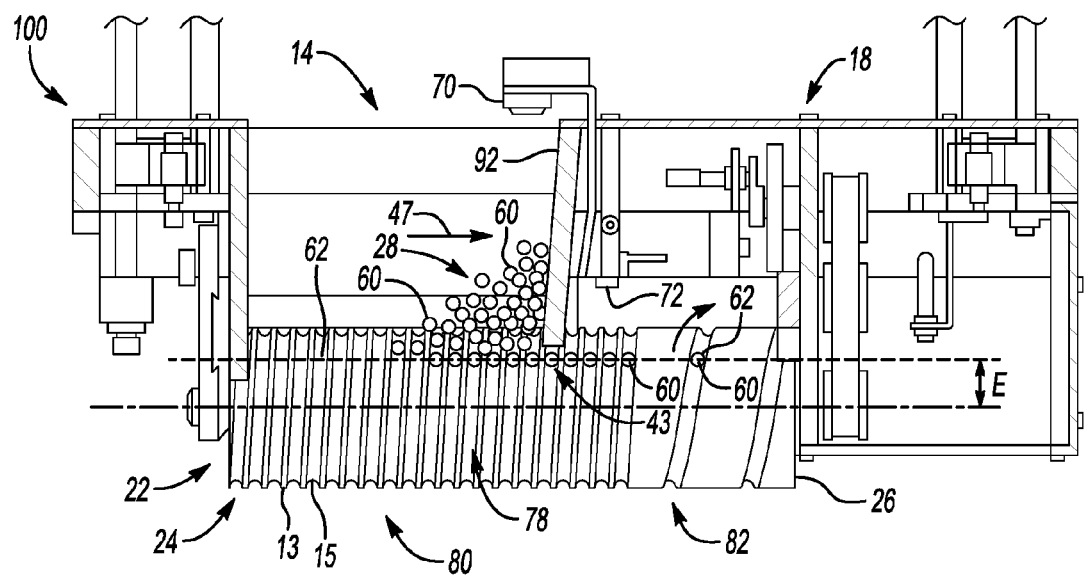
FIG. 9 is a schematic view of section 8-8 of the hopper system of FIG. 6 showing object positioning in the hopper system during object feeding including a mass of objects positioned in the hopper and individual objects positioned in feed pockets defined by the hopper screw set.

Further, as shown in FIGS. 9 and 21-24, upward and outward rotation, relative to the hopper 10, of the hopper screws 24, in combination with the thread form 78 of the hopper screws 24, progress the mass of objects 28 toward the discharge end 26 of the hopper 10 in the direction of arrow 47 shown in FIGS. 8 and 9, such that the mass of objects 28 accumulate against a discharge wall 92 of the hopper 10. The mass of objects 28 during rotation of the hopper screw set 22 is characterized by a tumbling motion such that objects 60 from the mass of objects 28 accumulate to the discharge wall 92 and are tumbled or cascaded rearward, e.g., away from the discharge wall 92 of the hopper 10 from the top portion (as shown in the figures) of the bulk mass 28 of objects 60 and into the feed pockets 62, where the objects 60 fall by gravity and are nested in the feed pockets 62, thereby being singulated for progression to the discharge end 26 of the hopper screw set 22 by rotation of the hopper screws 24, where each respective object 60 nested, e.g., positioned, in a feed pocket 62 is retained in the respective feed pocket 62 and progressed to the discharge end 26 of the hopper screw set 22 in the thread forms 78 of the hopper screws 24 defining the feed pocket 62. The tumbling and cascading action of the mass of objects 28 causes the feed pockets 62 to be filled sequentially, such that the possibility of an empty feed pocket 62 being progressed to the discharge end 26 of the hopper screw set 22 is avoided, e.g., is negligible or substantially eliminated. Further, the tumbling and cascading action of the mass of objects 28 causes sequential feeding of the objects 60 into the feed pockets 62 such that the hopper 10 can be run to a near empty condition, e.g., until only a few objects 60 remain in the hopper 10, without increasing the probability of an empty feed pocket 62 progressing to the discharge end 26. In one example, the feeding mechanism 100 can be run until less than five objects 60 remain in the bulk mass 28 of objects 60 in the hopper 10 prior to incurring a significant probability of an empty feed pocket 62 in the object 60 feeding sequence.

Figure 6:
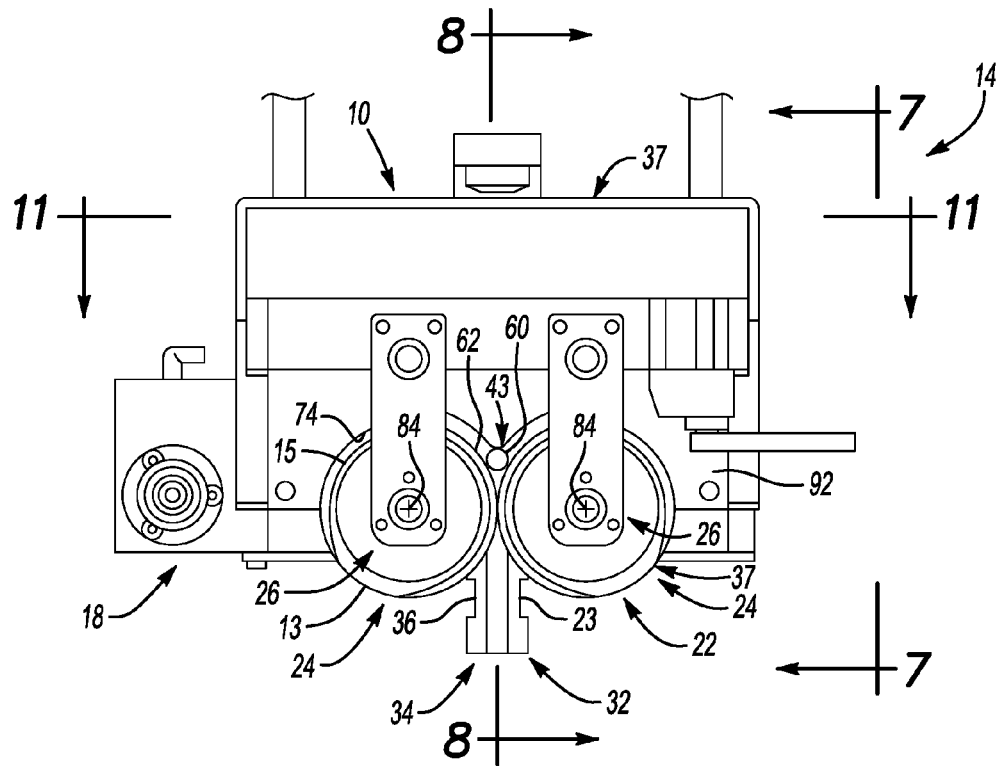
FIG. 6 is a schematic view of section 6-6 of FIG. 2 showing an end view of the hopper system of FIG. 1.
Figure 7:
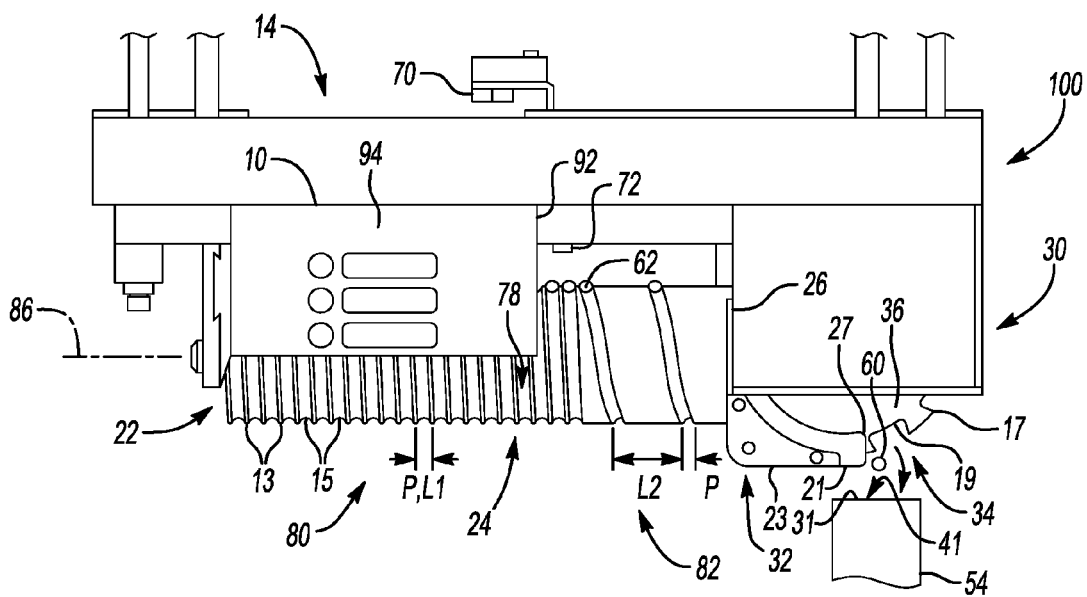
FIG. 7 is a schematic view of a front side view 7-7 of the hopper system of FIG. 6 including a single start hopper screw set.
Figure 14:
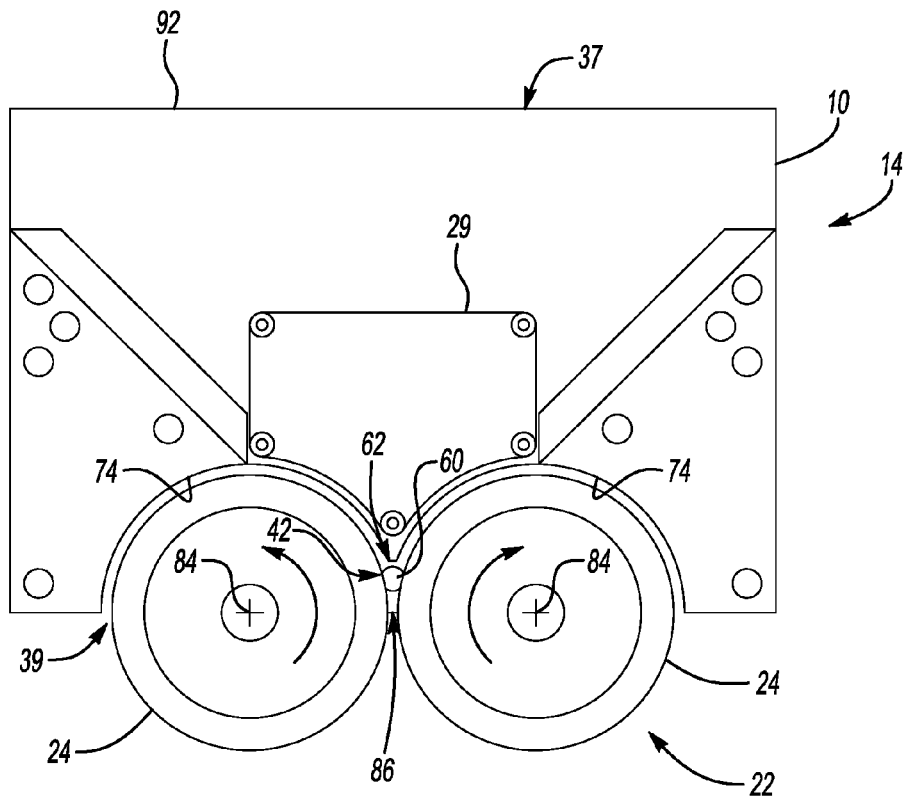
FIG. 14 is a schematic view of section 14-14 of the hopper and hopper screw set of FIG. 10.
Figure 15:
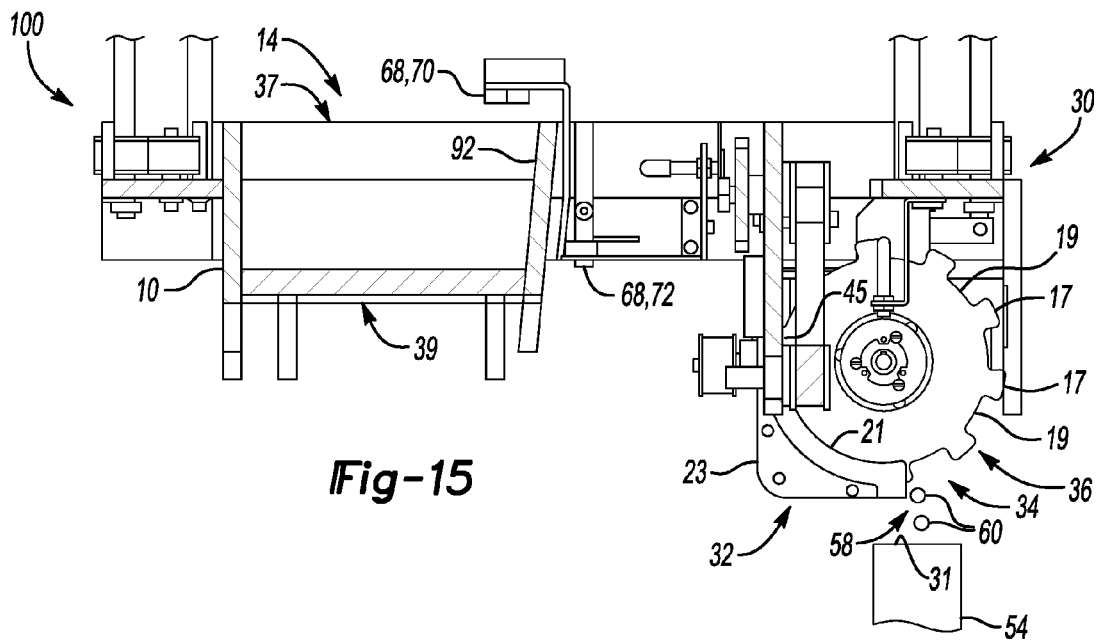
FIG. 15 is a schematic view of section 7-7 of the hopper system of FIG. 6 without the hopper screw set showing a sectional view of the hopper assembly and a front side view of the discharge assembly.

As shown in FIG. 14, the discharge wall 92 of the hopper 10 includes a contoured portion 74 partially defining the second hopper opening 39. The contoured portion 74 and the hopper screw set 22 are adjacent and cooperate to define a hopper outlet 43, as shown in FIGS. 6 and 14. The contoured portion 74 is contoured such that during rotation of the hopper screw set 22, the bulk mass of objects 28 is retained in the hopper 10, and the discharge wall 92 does not interfere with an object 60 nested in a feed pocket 62 as the nested object 60 progresses from the hopper portion 80 of the hopper screw set 22 to the discharge portion 82 of the hopper screw set 22 via the hopper outlet 43 partially defined by the contoured portion 74. The discharge wall 92 may include a viewing plate 29 for viewing the level or quantity of the mass of objects 28 in the hopper 10, for example, to determine whether the mass of objects 28 requires replenishment. In one example, the viewing plate 29 may be made of Lexan® or a similar transparent polymeric material. The hopper 10 may include a hopper panel 94, as shown in FIG. 10, configured to indicate the level or quantity of objects 60 in the hopper 10, for example, to determine whether the mass of objects 28 requires replenishment. Additional objects 60 may be fed to the hopper 10 manually from an object 60 source (not shown) which may be, for example, a carton or box of objects 60. The feeding mechanism 100 may include an auxiliary feeder (not shown) configured to feed additional objects 60 into the hopper 10 to replace objects 60 fed from the hopper 10, e.g., to replenish the bulk mass 28 of objects 60 during operation of the feeding mechanism 100. The auxiliary feeder may be actuated to feed additional objects 60 into the hopper 10 in response to outputs from one or more sensors 68, such as the hopper sensor 70 monitoring the amount of objects 28 in the hopper 10. In one example, the hopper sensor 70 may be configured as an optical sensor, as shown in FIG. 7, suspended over the hopper 10 to optically sense the quantity of objects 60 present in the hopper 10. The example is non-limiting, such that sensor 70 may be a non-optical type sensor.

Figure 21:
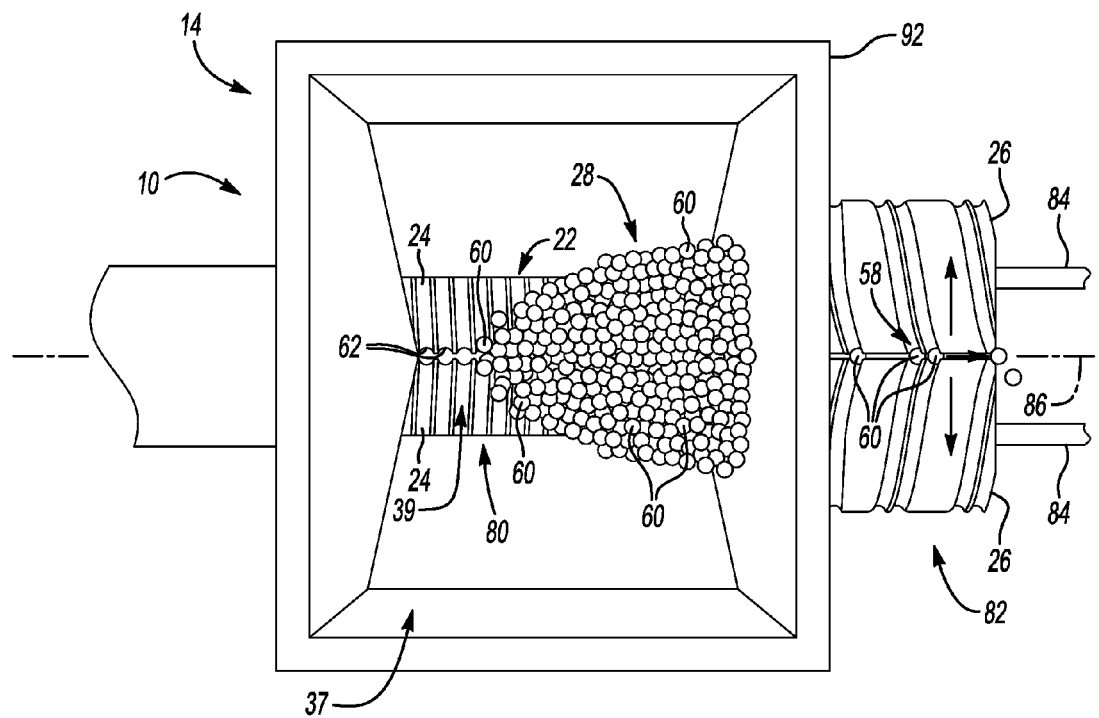
FIG. 21 is a schematic view of a top view of the hopper assembly including the hopper and hopper feed screws showing feeding of individual objects from a mass of objects in the hopper, further showing objects positioned in feed pockets defined by a double start hopper screw set.
Figure 22:
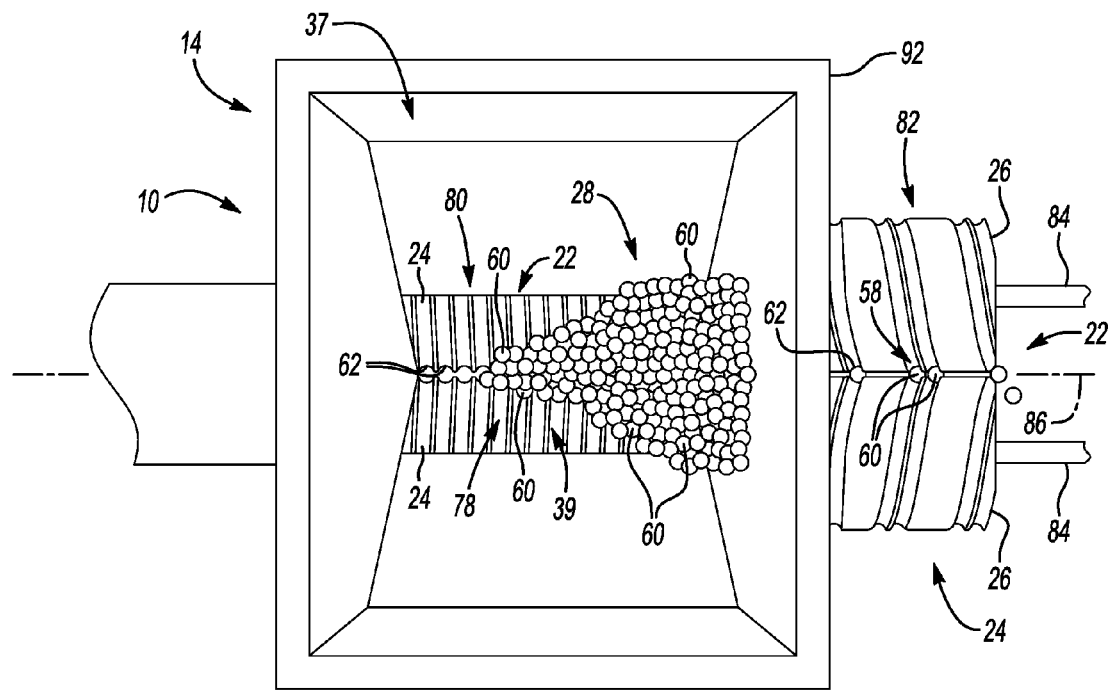
FIG. 22 is a schematic view of a top view of the hopper assembly of FIG. 21 showing a mass of objects including a reduced number of objects relative to FIG. 21.
Figure 23:
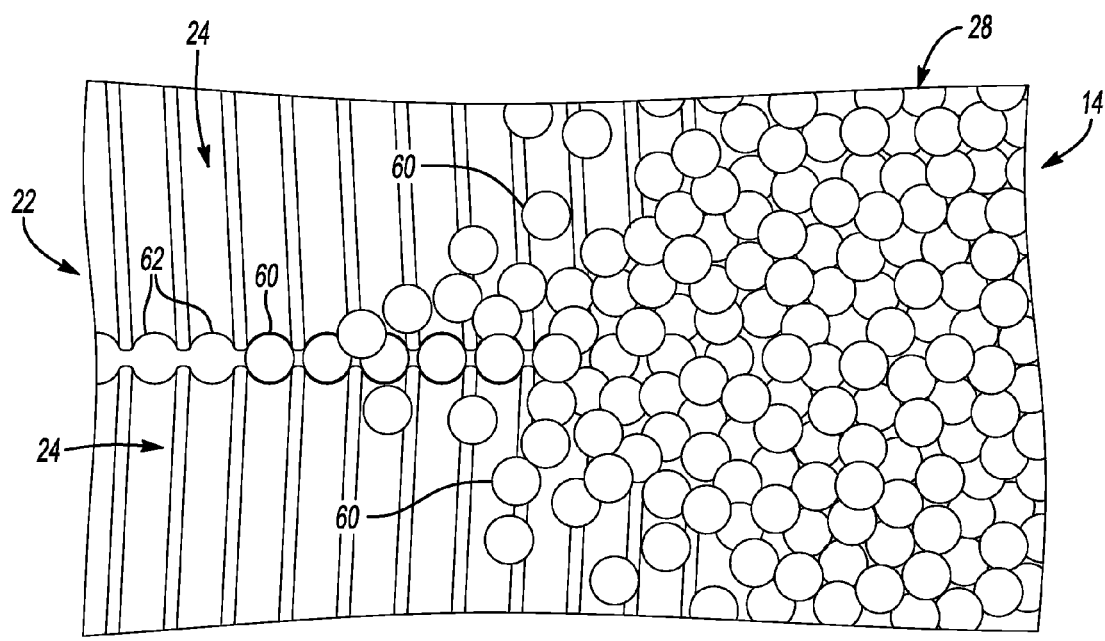
FIG. 23 is a schematic view of a top view of the hopper screw set of FIG. 21, showing objects positioning in feed pockets defined by the hopper screw set.
Figure 24:
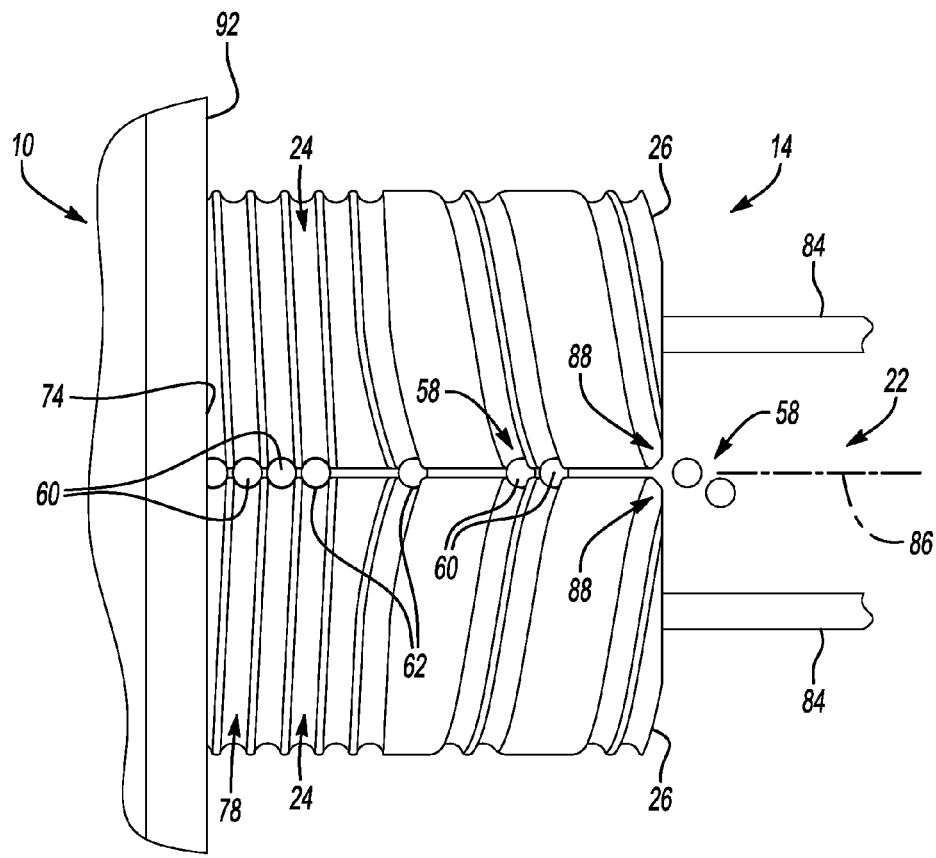
FIG. 24 is a schematic view of a top view of the discharge end of the hopper screw set of FIG. 21 showing object sets being discharged from the double start hopper screw set.

Referring now to FIGS. 21-22, FIG. 21 shows the cascading pattern of the bulk mass 28 including a first quantity of objects 60 in the hopper 10. FIG. 22 shows the cascading pattern of the bulk mass 28 including a second quantity of objects 60 in the hopper 10, after the feeding mechanism 100 has been operated such that the number of objects 60 in the second quantity shown in FIG. 22 is less than the number of objects 60 in the first quantity shown in FIG. 21. As shown in FIGS. 21-22, the cascading and tumbling pattern of the mass 28 of objects 60 nesting by gravity (as shown in detail in FIG. 23) remains substantially the same as the quantity of objects 60 forming the mass of objects 28 decreases over time during operation of the feeding mechanism 100 and depletion of objects 60 from the hopper 10. FIGS. 24-26 shown the hopper screw set 22 at various axial positions during rotation of the hopper screws 24, and show the object 60 feeding sequence, e.g., the sequence of objects 60 nested in the feed pockets 62 defined by the hopper screw set 22. As shown in FIG. 24, the objects 60 are discharged from the discharge end 26 of the hopper screw set 22 at the thread starts 88 of the respective thread forms 78 as the hopper screws 24 rotate together. As described herein and shown in FIGS. 12, 13, 21, 22 and 24, the hopper screws 24 are aligned to each other such that, during rotation of the hopper screw set 22, the thread starts 88 of the respective thread forms 78 of the respective hopper screws 24 meet in rotation at the discharge end 26 at approximately the pocket height E, such that the object 60 is discharged from the discharge end 26 of the hopper screw set 22 at a controlled and repeatable discharge height, which may be the pocket height E or a height substantially adjacent the pocket height E.

Figure 16:
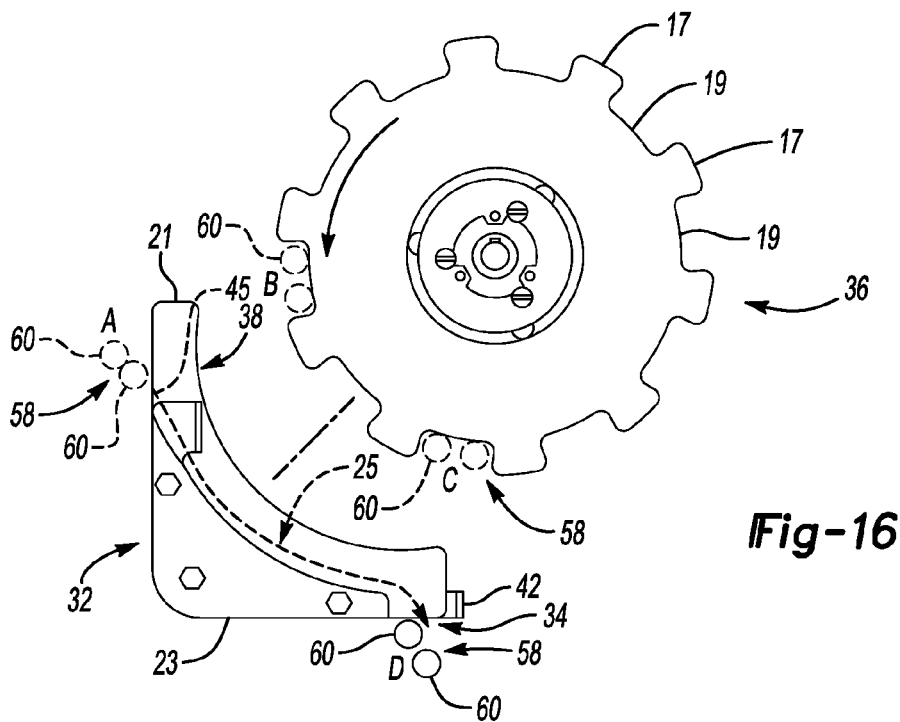
FIG. 16 is a schematic exploded side view of the start wheel and ramp assembly of the discharge assembly of FIG. 15 showing a feed path of objects fed from the double start hopper screw set of FIG. 10.

In the example shown in FIGS. 21-24, the hopper screws 24 are configured as double start hopper screws 24 such that with each full (360 degree) rotation of the hopper screw set 22 an object set 58 consisting of two objects 60 in adjacent feed pockets 62 defined by the adjacent double start thread forms 78 are discharged from adjacent thread starts 88 at the discharge end 26 of the hopper screw set 22 at a discharge height substantially equal to, e.g., immediate adjacent to or at, the pocket height E. As shown, for example, in FIGS. 7 and 10, the number of thread starts 88 defined by each of the thread forms 78 defines the number of feed pockets 62 progressed together to the discharge end 26 during each predetermined feed interval, such that the number of thread starts 88 determines the number of objects 60 in the object set 58 discharged from the discharge end 26 of the hopper screw set 22 and, via the discharge assembly 30, from the discharge outlet 34. As shown in FIGS. 14-19, the hopper system 14 and discharge assembly 30 are aligned such that the hopper screw set 22 discharges the object set 58 to a ramp 38 of a ramp assembly 32, where the objects 60 of the object set 58 are received into a recess 19 of a star wheel 36 rotating adjacent the ramp 38. The ramp 38 is enclosed by ramp sidewalls 21 such that the object or objects 60 forming the object set 58 is/are retained in the recess 19 on the ramp surface 25. The star wheel 36 is aligned relative to the ramp 38 and is synchronized with, e.g., is driven in coordination with, the hopper screw set 22 and the feeding screw set 52 such that the object set 58 is discharged onto a receiving end 45 of the ramp 38 and is retained in a single recess 19 of the star wheel 36 as the star wheel 36 rotates relative to the ramp 38. The star wheel 36 includes a plurality of teeth 17 and a plurality of recesses 19, each recess 19 defined by a pair of adjacent teeth 17. The object set 58 is retained in the single recess 19 and against the ramp surface 25 as the star wheel 36 rotates counterclockwise as shown in FIG. 16, in coordination with rotation of the hopper screw set 22 and the feeding screw set 52, to progress the object set 58 to the discharge outlet 34 of the ramp assembly 32, where the object set 58 is discharged and falls by gravity into a container 54 which has been positioned by the article feeding system 12 and feeding screw set 52 below the discharge outlet 34. In one example, the feeding screw set 52 is configured to dwell the container 54 at the discharge outlet 34, e.g., to momentarily halt the forward motion of the container 54 on the conveyor 44 at the discharge outlet 34 to receive the object set 58 via the container opening 31. The rotation of the hopper screw set 22 and the rotation of the star wheel 36 are coordinated, e.g., synchronized, such that an object set 58 is discharged from the discharge outlet 34 at a predetermined interval which corresponds with the predetermined interval at which a receiving article (container) 54 is presented to the discharge outlet 34. The plurality of recesses 19 are radially distributed along the perimeter of the star wheel 36, such that the predetermined radial spacing of the recesses 19 corresponds to the predetermined interval at which the object set 58 is discharged from the discharge assembly 30. The predetermined interval at which each object set 58 is sequentially discharged from the discharge outlet 34 and each receiving article 54 is sequentially presented to the discharge outlet 34 to receive the discharged object set 58 is determined by the lead L2 of the second portion 82 of the hopper screws 24, the radial spacing of the recesses 19 of the star wheel 36, and the screw form of the feeding screws 56. The rate at which each object set 58 is discharged from the discharge outlet 34 to a receiving article 54 is determined by the predetermined interval and the synchronized respective rotation speeds of each of the hopper screw set 22, the star wheel 36, and the feeding screw set 52.

Figure 17:
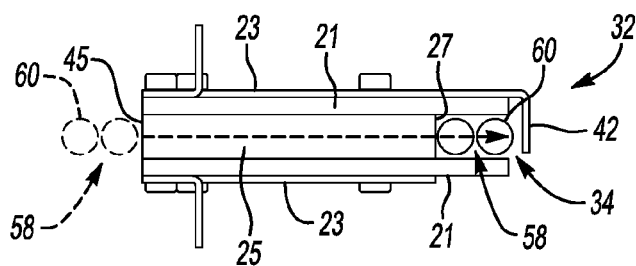
FIG. 17 is a schematic top view of the ramp assembly of FIG. 16.
Figure 18:
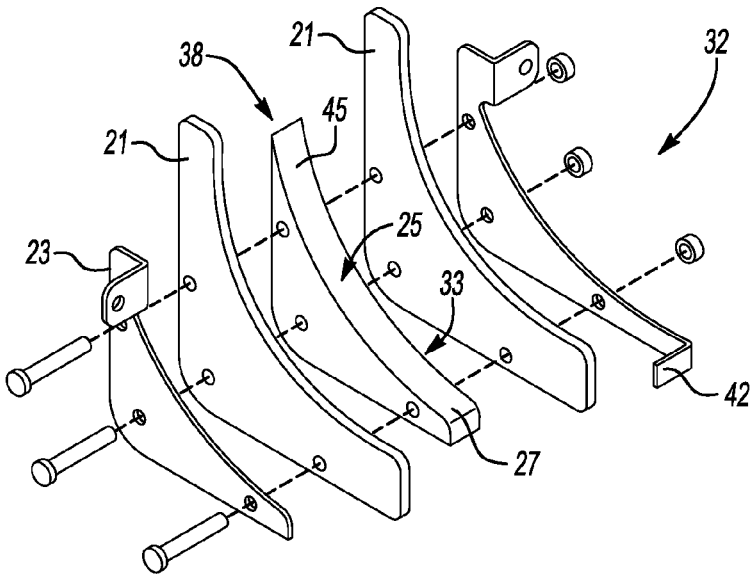
FIG. 18 is a schematic exploded view of the ramp assembly of FIG. 16.
Figure 19:
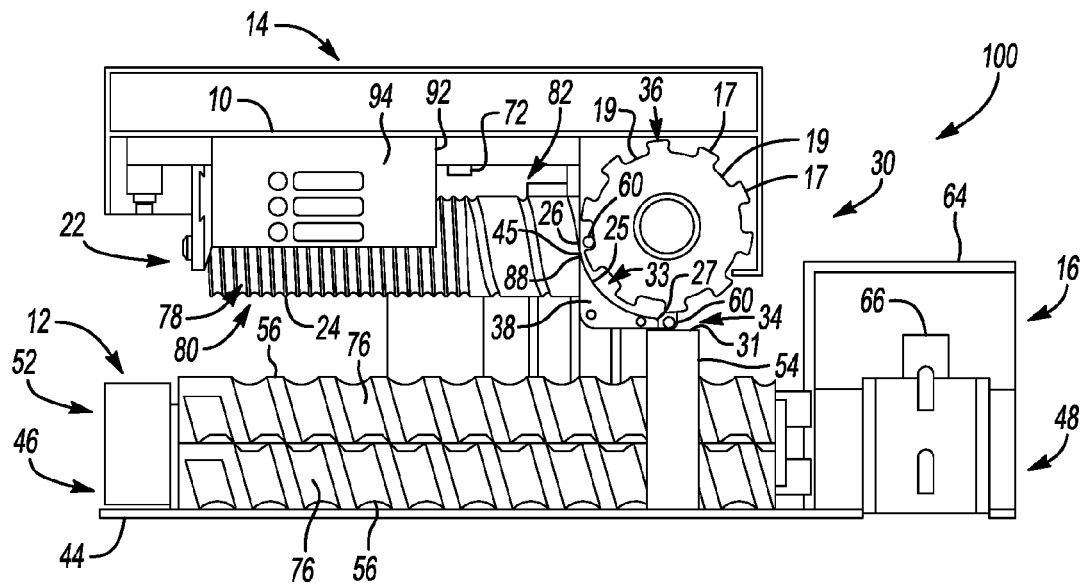
FIG. 19 is a schematic partial front side view of the object feeding mechanism of FIG. 2 including a sectional view of the discharge assembly showing a feed path of objects fed from the single start hopper screw set of FIG. 2 to a receiving article via the discharge assembly, and further showing a reject system.
Figure 20:
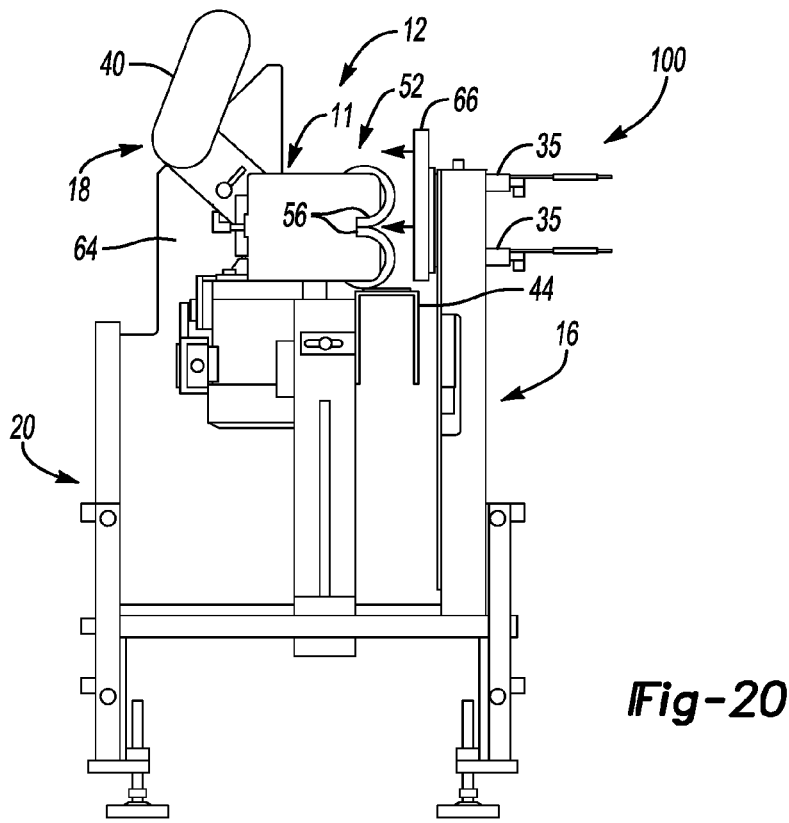
FIG. 20 is a schematic partial end view of the conveyor system and reject system viewed from the infeed end.

The ramp assembly 32, including the ramp 38 and the ramp sidewalls 21, is shown in detail in FIGS. 16-18. As shown in FIGS. 16-18, the ramp assembly 32 may include a deflector 42 to deflect objects 60 exiting the ramp 38 through the discharge outlet 34. The deflector 42 may be integral to the ramp sidewall 21 or to a ramp bracket 23, as shown in FIG. 18. The ramp profile 33, including the curvature of the ramp surface 25 and the shape of a terminating end 27 of the ramp 38, may be configured to control the trajectory of an object 60 as the object 60 is released from the star wheel 36 recess 19 and is gravity fed down the ramp 38 to the terminating end 27 for discharge at the discharge outlet 34. By way of non-limiting example, the feeding mechanism 100 may be configured such that container 54 can be presented to the discharge outlet 34 to provide a nominal vertical distance between the discharge outlet 34 and the container opening 31 of 0.25 inches (approximately 5-8 mm) to limit the vertical distance the object 60 must drop from the discharge outlet 34 to the target 41, e.g., to the container opening 31 to be received into the container 54.

In one example, an object set 58 consisting of a predetermined number of objects 60 is discharged from the hopper screw set 22 with each 360-degree rotation of the each hopper screw 24 about the axis 84 of each respective hopper screw 24 to the discharge assembly 30 and via the discharge assembly 30 into the container 54. In a non-limiting example illustrated by FIGS. 10-11, 16-17, and 21-24, the hopper screw set 22 shown in FIGS. 10-11, 16-17, and 21-24 includes a pair of double start hopper screws 24, e.g., each hopper screw 24 having a double thread form 78 and two thread starts 88 at the discharge end 26, where the thread starts 88 are immediately adjacent each other, such that with each full (360 degree) rotation of the hopper screw set 22 an object set 58 consisting of two objects 60 discharged from the hopper screw set 22 and fed via the discharge assembly 30 to an opening 31 of a corresponding container 54 presented to the discharge outlet 34. The examples provided herein are non-limiting, and it would be understood that the hopper screw set 22 may include hopper screws 24 configured to discharge an object set 58 consisting of a predetermined number of objects 60, where the predetermined number of objects 60 in each object set 58 may be one, two, three, or a number greater than three.

In another non-limiting example, and referring to FIGS. 7-9, each hopper screw 24 of the hopper screw set 22 includes a single thread form 78 and a single thread start 88 at the discharge end 26, such that with each full (360 degree) rotation of the hopper screw set 22 a single object 60 is fed into each container 54. As would be understood, a single start hopper screw 24 includes a single start thread form 88, such that each full (360 degree) rotation of the hopper screw 24 advances the hopper screw 24 axially by a single pitch P. In the example shown the thread form 78 in the hopper portion 80 of the hopper screw 24 in FIG. 7 is configured as a uniform or regular thread form 78 such that the lead L1 and the pitch P of the thread form 78 in the hopper portion 80 is the same. In contrast, and as shown in FIG. 10, a double start hopper screw 24 includes two screw threads formed adjacent to each other, such that each rotation of the screw advances the screw axially by two times the pitch P. In this instance, for a thread form 78 having a uniform or regular lead, the lead L1 is twice the pitch P of the screw, as shown for the hopper portion 80 of the hopper screw 24 in FIG. 10. As shown in FIG. 12, the pitch P of the thread form 78 is constant for the length of the hopper screw 24. In the examples shown herein, referring to FIGS. 7-11, the hopper screws 24 include a continuous thread form 78 which may have a constant pitch P and a variable lead, such that the thread form 78 is formed with a first lead L1 extending a first portion 80 of the hopper screw 24 adjacent the hopper 10, and with a second lead L2 extending a second portion 82 of the hopper screw 24 adjacent the discharge end 26 of the hopper screw 24. The second lead L2 in the example shown is greater than the first lead to correspond to and/or define the predetermined feed interval at which the object set 58 is discharged from the discharge end 26 of the hopper screw set 22 during operation of the feeding mechanism 100.

The feeding mechanism 100 described herein is distinguished and advantaged by its ability to feed singulated objects 60 and/or object sets 58 at a high rate of speed. For example, the single start hopper screw set 22 shown in FIG. 2 can be rotated at a speed of X rotations per minute (rpm), such that a single object 60 (e.g., an object set 58 consisting of one object 60) can be fed in to a container 54 at a rate of X containers per minute (cpm), e.g. the feeding mechanism 100 including a single start hopper screw set 22 can discharge a single object 60 to a target 41 with each rotation of the hopper screws 24, at a rate of X objects per minute where the hopper screws are rotating at a speed of X rpm. The value of X is determined to provide a desired rate at which the object sets 58 are fed to the receiving articles 54, and may be varied for a specific configuration of the receiving article 54, the predetermined number of objects 60 in the object set 58, the shape or configuration of the objects 60, the shape or configuration of the target 41 defined by the receiving article 54, etc. By way of example, the feeding mechanism 100 can be set to provide a desired container feeding rate of at least 180 rpm, and up to 300 rpm, such that the feeding mechanism 100 can be set using a value of X which is $180 \leq X \leq 300$. The examples are illustrative and it would be understood that feed rates at a value of X less than 180 cpm may also be used.

In an illustrative example, the single start hopper screw 24 can be set to rotate at 300 rpm, such that the feeding mechanism 100 may discharge (feed) one object 60 to each container 54 of a plurality of containers 54 presented to the discharge outlet 34 at a rate of 300 containers per minute. In another example, the double start hopper screw set 22 shown in FIG. 10 can be rotated at a speed of X rotations per minute (rpm), such that an object set 58 of two objects 60 can be fed in to a container 54 at a rate of X containers 54 per minute. In this example, the double start hopper screw 24 may be set to rotate at 300 rpm, such that the feeding mechanism 100 may feed two objects 60 (one object set 58) into each container 54 of a plurality of containers 54 presented to the discharge outlet 34 at a rate of 300 containers per minute. These examples are illustrative and non-limiting, and hopper screw 24 rotation speeds of more or less than 300 rpm can be achieved using the feeding mechanism 100 described herein. For example, the feeding mechanism 100 may be configured to feed objects 60 at the rate of 600 objects per minute, e.g., with a hopper screw 24 rotation speed of 600 rpm and a container feed rate of 600 containers per minute. The feed rate and rotation speed of the hopper screws 24 can be varied as required by the shape and size of container 54, the size and shape of the object 60 being fed, the shape and size of the container opening 31 into which the object 60 is being fed, etc., and to correspond to a feeding rate of the containers 54 and a predetermined interval at which the containers 54 are presented by the feeding system 12.

The size and shape of the objects 60 being fed by the feeding mechanism 100 may be varied. In a non-limiting example, a spherical object 60 such as a marble or ball bearing having a nominal diameter of ⅝ inches (approximately 0.055" or 14 mm) is fed into a container 54 through a container opening 31 presented to the discharge outlet 34, where the container opening 31 is approximately 1¼ inches in diameter (approximately 32 mm). The example is non-limiting, and objects 60 and containers 54 of other sizes and shapes, and with container openings 31 of other sizes and shapes, may be processed in combination, e.g., to feed an object set 58 of one or more objects 60 to a target 41, which can be an opening 31 of a container 54, using the feeding mechanism 100 described herein. In one example, the feeding mechanism 100 can be configured to feed singulated objects 60 into containers 54 having a width or diameter between one to three inches and a height between 66 mm to 300 mm, where the container opening 31 may vary in size from one to three inches. As described previously, the hopper screw set 22 rotation speed, the star wheel 36 rotation speed, and the feeding screw set 52 rotation speed are adjusted via the drive system 18 to correspond with each other to provide a predetermined interval at which a container 54 is presented to the discharge outlet 34 by the conveyor 44, and an object set 58 including a predetermined number of objects 60 is discharged from the hopper screw set 22 and via the discharge outlet 34 into the container 54 positioned at the discharge outlet 34.

The object 60 being fed can be a spherical object 60, where the term "spherical object" as used herein is defined as an object 60 which is substantially spherical, e.g., spherical within the design and/or manufacturing tolerances typically applied to that type of object 60, and does not require that the spherical object 60 is "perfectly" spherical in shape. Examples of spherical objects 60 include marbles, ball bearings, ball-shaped food or pharmaceutical products, etc. The example of a spherical object 60 is non-limiting. In other examples (not shown) the object 60 may be oval, ellipsoid, spheroid, or of like shape such that a rounded or semi-rounded portion or surface of the object 60 can seat into a feed pocket 62 to be singulated and conveyed axially in a feed direction from the hopper 10 to a discharge end 26 of the hopper screw set 22 by rotation of the hopper screws 24 as described herein, for discharge to a container 54. For example, an object 60 may have a semi-round shape, such as a pear shape, or present a semi-round surface such as a rounded end of a round end cylinder 35 or capsule.

In a non-limiting example, the feeding mechanism 100 includes a reject system 16 including a reject pad 66 movable by one or more actuators 35 in communication with one or more sensors 68. The feeding mechanism 100 and/or reject system 16 can include a controller configured to receive and send signals between the actuators 35 and the sensors 68. By way of example, the feeding mechanism 100 may include a first sensor 72 to sense whether an object 60 is present in each feed pocket 62 defined by the hopper screw set 22, and a second sensor 70 to sense the object mass 28 in the hopper 10. Other sensors 68, such as a sensor 68 to sense the presence of an object 60 in a recess 19 of the star wheel 36, or the quantity of objects 60 in the mass of objects 28 in the hopper 10, may be included in the feeding mechanism 100. The examples provided are not to be limiting and other sensors may be included in the feeding mechanism 100, configured to determine the status and/or condition of the objects 60 and the receiving articles 54 during a feeding event. For example, the conveyor 44 can include one or more sensors to sense the weight of a receiving article 54 before and/or after presentation of the receiving article 54 to the discharge outlet 34, to determine whether the receiving article 54 has received the object set 58 dispensed from the discharge outlet 34. As shown in FIG. 2, the reject system 16 in communication with one or more of the sensors 68, 70, 72 is configured to actuate a reject pad 66 when a misfeed condition or other rejectable or undesirable condition is detected by the reject system 16 via the sensors 68, 70, 72, such that the container 54 exhibiting the rejectable condition, for example, a container 54 which does not receive an object 60, is removed from the conveyor 44 into a reject bin 64 by the reject pad 66. In the example shown, when a misfeed condition is detected, one or more of the actuators 35 are actuated when the container 54 which has been misfed is presented to the reject pad 66, to actuate movement of the reject pad 66 such that the reject pad 66 is extended toward the conveyor 44 and in contact with the container 54 to deflect the misfed container 54 into the reject bin 64. The reject pad 66 may be made of a cushioned and/or non-abrasive material to prevent contact damage to the container 54. In the example shown in FIGS. 1 and 2, the reject pad 66 is extended by actuating the actuators 35, which are configured as pneumatic cylinders. The example shown is non-limiting, such that the cylinders 35 may be magnetically fired, include solenoids, and/or the reject pad 66 may be actuated by one or a combination of mechanical, electrical, magnetic, hydraulic and/or pneumatic means. The reject bin 64 may be cushioned, lined or otherwise configured to prevent damage to the rejected container 54 displaced into the reject bin 64 by the reject pad 66. The example is non-limiting, and other means of removing a misfed container 54 from the conveyor 44 may be used. For example, an air blast can be used to blow a misfed container 54 from the conveyor 44. A pick and place mechanism can be used to attach the container 54 and remove the container 54 from the conveyor 44 to a reject bin 64 or to be placed back into an infeeding system (not shown) for recirculation to the conveyor 44 and through the feeding mechanism 100. When no misfeed is detected, the properly fed container 54 exits from the feeding mechanism 100 via the outfeed end 48 of the conveyor 44.

The illustrative example of an object 60 shaped as a rounded or substantially spherical object, a receiving article 54 configured as a container, and a target 41 defined by the opening 31 of the container 54 is not intended to be limiting. It would be understood that the feeding mechanism 100 may be configured within the scope of the description provided herein to feed rounded or semi-rounded objects 60, for example, by modifying the thread form 78 of the hopper screw 24 to modify the profile of the feed pocket 62 formed by the hopper screw set 22 to receive and singulate semi-rounded objects to the discharge assembly 30 in an object set 58. The receiving article 54 may be configured other than a container. For example, the receiving article 54 may be a component part or assembly configured to receive one or more ball bearings, where the feeding system 12 may be modified to convey the component part for presentation to the discharge outlet 34, for example, by modifying the screw form 76 of the feeding screw 56 and/or otherwise modifying the feeding system 12 to sequentially present the receiving article 54 to the discharge outlet 34.

The above features and other features and advantages of the present invention are readily apparent from the detailed description of the best modes for carrying out the invention described herein, when taken in connection with the accompanying drawings. While some of the best modes and other embodiments for carrying out the claimed invention have been described in detail, various alternative designs and embodiments exist for practicing the invention.

The invention claimed is:

1. A discharge assembly comprising:
a ramp including ramp surface defining a receiving end and a terminating end;
a star wheel defining a recess;
wherein the star wheel is rotatable to selectively rotate the recess relative to the ramp surface;
wherein the recess is configured to cooperate with the receiving end of the ramp to receive an object set into the recess when the recess is rotated to the receiving end, and to retain the object set between the star wheel and the ramp surface during rotation of the recess from the receiving end to the terminating end;
wherein the object set includes at least one object;
wherein the recess is configured to cooperate with the terminating end of the ramp to release the object set from the recess when the recess is rotated to the terminating end and discharge the object set from the terminating end of the ramp;
a ramp assembly including the ramp and a deflector;
wherein the deflector is positioned relative to the ramp to define an outlet; and
wherein the object set is discharged from the terminating end via the outlet.

2. The discharge assembly of claim 1, wherein:
the recess is one of a plurality of recesses;
the star wheel includes a plurality of teeth distributed radially about the star wheel; and
each adjacent pair of teeth comprising the plurality of teeth defines a respective recess of the plurality of recesses therebetween.

3. The discharge assembly of claim 1, wherein the ramp surface is continuous between the receiving end and the terminating end.

4. The discharge assembly of claim 1, further comprising:
a ramp assembly including the ramp and at least one sidewall adjacent the ramp surface; and
an outlet defined by the at least one sidewall and the terminating end, wherein the object set is discharged from the ramp surface via the outlet.

5. The discharge assembly of claim 4, further comprising:
a deflector;
wherein the deflector positioned relative to the ramp to define the outlet; and
wherein the deflector is attached to the sidewall.

6. The discharge assembly of claim 1, wherein the object set includes at least two objects.

7. The discharge assembly of claim 1, wherein a trajectory at which the object set is discharged from the ramp is defined by a shape of the ramp surface.

8. The assembly of claim 7, wherein the trajectory is controlled by the deflector such that the object set is dropped by gravity from the outlet.

9. The discharge assembly of claim 7, where the shape of the ramp surface is arcuate.

10. The discharge assembly of claim 1, further comprising:
an article feeding system configured to sequentially present each of a plurality of receiving articles to the terminating end of the ramp;
wherein each receiving article defines a target; and
wherein the object set is discharged from the terminating end of the ramp such that the object set is received by the target of the receiving article presented by the article feeding system.

11. The discharge assembly of claim 10, further comprising:
a sensor to sense the presence of the object set in one of the receiving article and the recess during rotation of the recess from the receiving end to the terminating end; and
a reject system selectively actuated when the sensor fails to sense the presence of the object set in the one of the receiving article and the recess.

12. The discharge assembly of claim 1, wherein the at least one object is one of a rounded object and a semi-rounded object.

13. A discharge assembly comprising:
a ramp including a ramp surface defining a receiving end and a terminating end;
a star wheel defining a recess;
wherein the star wheel is rotatable to selectively rotate the recess relative to the ramp surface;
wherein the recess is configured to cooperate with the receiving end of the ramp to receive an object set into the recess when the recess is rotated to the receiving end, and to retain the object set between the star wheel and the ramp surface during rotation of the recess from the receiving end to the terminating end; and
wherein the object set includes at least one object;
an object feeding mechanism including:
a screw set including first and second screws adjacent each other to define a longitudinal axis therebetween;
wherein the first and second screws are rotatable relative to each other to singulate the at least one object from a plurality of objects and to progress the at least one object to a discharge end of the screw set; and
wherein the screw set is configured to discharge the object set including the at least one object from the discharge end to the receiving end of the ramp such that the object set is received into the recess.

14. The discharge assembly of claim 13, wherein:
each of the first and second screws defines a respective thread form and is rotatable on a respective screw axis;
the longitudinal axis of the screw set and the screw axes of the first and second screws are coplanar in a first plane; and
the first and second screws are rotatable relative to each other such that the thread forms of the first and second screws during rotation are mirror images relative to a second plane;
wherein the second plane is perpendicular to the first plane and includes the longitudinal axis.

15. A method for discharging an object, the method comprising:
selectively rotating a star wheel relative to a ramp having a ramp surface defining a receiving end and a terminating end;
wherein the star wheel defines a recess for receiving an object set including at least one object;
wherein selectively rotating the star wheel further comprises:
receiving the object set into the recess when the recess is rotated to the receiving end of the ramp;
retaining the object set in the recess and between the star wheel and the ramp surface while the recess is rotated from the receiving end to the terminating end of the ramp; and
releasing the object set from the recess when the recess is rotated to the terminating end to discharge the object set from the terminating end of the ramp;
wherein the assembly includes a deflector positioned adjacent the terminating end to define an outlet between the deflector and the terminating end;

the method further comprising:
discharging the object set from the terminating end of the ramp at a trajectory defined by the shape of the ramp surface; and
deflecting the object set from the trajectory using a deflector such that the object set is dropped by gravity through the outlet.

16. The method of claim 15, wherein:
the recess is one of a plurality of recesses;
the star wheel includes a plurality of teeth distributed radially about the star wheel; and
each adjacent pair of teeth comprising the plurality of teeth defines a respective recess of the plurality of recesses therebetween;
the method further comprising:
receiving a respective object set into each respective recess when the respective recess is rotated to the receiving end of the ramp;
retaining the respective object set in the recess and between the star wheel and the ramp surface while the respective recess is rotated from the receiving end to the terminating end of the ramp;
sequentially presenting, via an article feeding system, a respective one of a plurality of receiving articles to the terminating end of the ramp;
wherein presentation of each receiving article by the article feeding system is synchronized with rotation of the star wheel such that the respective one of the plurality of receiving articles is presented when the respective recess is rotated to the terminating end of the ramp;
releasing the respective object set from the respective recess when the respective recess is rotated to the terminating end to discharge the respective object set from the terminating end of the ramp; and
receiving the respective object set into the respective receiving article.

17. A method for discharging an object, the method comprising:
selectively rotating a star wheel relative to a ramp having a ramp surface defining a receiving end and a terminating end;
wherein the star wheel defines a recess for receiving an object set including at least one object;
wherein selectively rotating the star wheel further comprises:
receiving the object set into the recess when the recess is rotated to the receiving end of the ramp;
retaining the object set in the recess and between the star wheel and the ramp surface while the recess is rotated from the receiving end to the terminating end of the ramp; and
releasing the object set from the recess when the recess is rotated to the terminating end to discharge the object set from the terminating end of the ramp;
the method further comprising:
receiving a bulk mass of objects to a feeding mechanism;
wherein:
the feeding mechanism includes a screw set;
the screw set including a first screw and a second screw each rotatable on a respective screw axis and adjacent each other such that the first and second screws define a longitudinal axis therebetween;
each of the first and second screws are characterized by a thread form such that the thread forms of the first and second screws cooperate to form a plurality of feed pockets parallel to the longitudinal axis and extending the length of the screw set;
the hopper screw set includes a discharge end;
rotating the first and second screws in contact with the bulk mass of objects such that the at least one object is singulated from the bulk mass of objects into a respective one of the plurality of feed pockets to form the object set;
progressing the object set including the at least one object in the respective one of the feed pockets to the discharge end by rotation of the first and second screws;
discharging the object set including the at least one object from the discharge end; and
synchronizing the rotation of the screw set and the rotation of the star wheel such that the object set is discharged from the discharge end is received into the recess at the receiving end of the ramp.

* * * * *